(No Model.)

W. L. COOP.
SWIVEL BLOCK.

No. 310,386. Patented Jan. 6, 1885.

WITNESSES:
J. M. Yznaga
P. U. Hale

INVENTOR:
William L. Coop,
by W. B. Hale
Atty.

UNITED STATES PATENT OFFICE.

WILLIAM L. COOP, OF PROVIDENCE, RHODE ISLAND.

SWIVEL-BLOCK.

SPECIFICATION forming part of Letters Patent No. 310,386, dated January 6, 1885.

Application filed November 12, 1884. (No model.)

*To all whom it may concern:*

Be it known that I, WILLIAM L. COOP, a citizen of the United States, residing at Providence, in the county of Providence and State of Rhode Island, have invented certain new and useful Improvements in Swivel-Blocks; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

The objects of this invention are, first, to provide a means of taking up any wear of the bearings on which the block rotates, and, second, to cause the bearings to offer a slight resistance to the rotation of the block.

Figure 1:
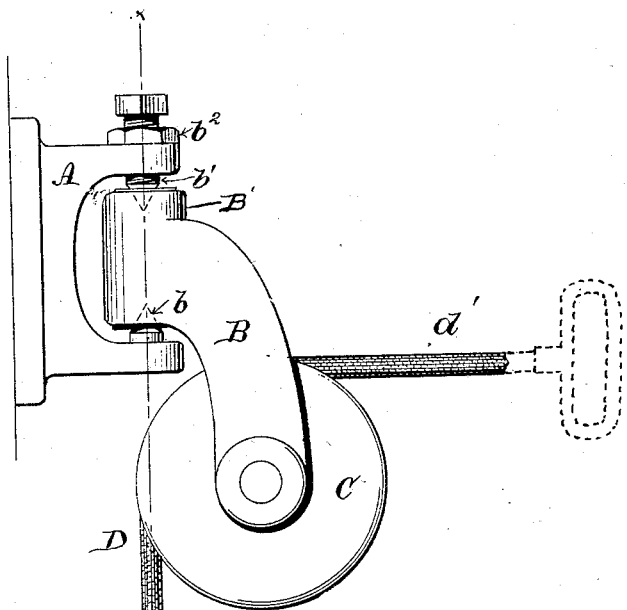
Figure 2:
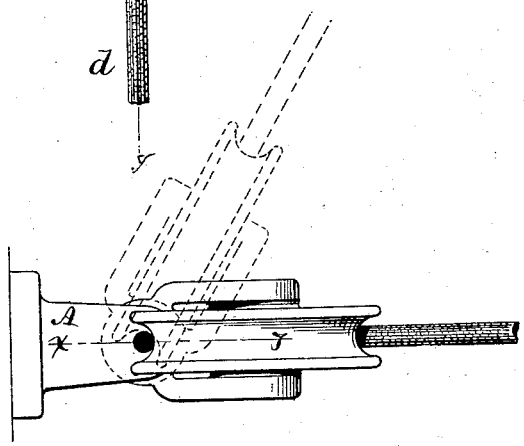
Figure 3:
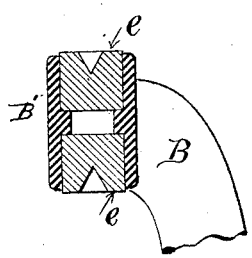

In the drawings, Figure 1 is a side view of my improved swivel-block. Fig. 2 is a view of the under side of the same; and Fig. 3 is a section of the block B on the line $x\, y$, Fig. 1.

Similar letters refer to similar parts throughout the several views.

A is a bracket, secured to a wall or post by suitable means, and provided with the conical centers $b\, b'$. The center $b'$ is tapped into the bracket A, and provided with a set-nut, $b^2$, to secure it when it is properly adjusted. The block B is chambered to receive plugs $e\, e$, of wood or similar material, in which are conical recesses to receive the centers $b\, b'$. The end $d$ of the rope D, which passes over the sheave C, is secured to the weight to be raised, the other end, $d'$, being provided with a handle.

In gymnastic apparatus, where this form of swivel-block is frequently used, it is desirable to have the block B respond quickly to any change in direction of the end $d'$ of the rope D. At the same time it is disagreeable to the operator to have the said block swing by the angle formed by the rope or to vibrate loosely on its bearings.

By means of the elastic bearings $e\, e$ and the adjustable center $b'$, any desired degree of friction may be exerted to prevent the block B from swinging too freely.

The recessed wooden plugs $e\, e$ are saturated with oil and the recess coated with plumbago, thus forming a well-lubricated bearing, which will allow the block B to swing without noise.

I am aware that a crank-shaft has had elastic bearings in its ends to receive center pivots, one of which is adjustable, and I lay no claim to such construction, its object being entirely different from that of my improvement; nor do I claim, broadly, a swiveling pulley-block, they being very common, as is well-known.

Having thus described my invention, what I claim, and desire to secure by Letters Patent, is—

The combination, with the bracket having the center pivots, one of which is adjustable, of the swiveling pulley-block having plugs of elastic material let into its opposite ends, and chambered to receive said center pivots, and the sheave pivoted in said block at right angles to the swivel-axis of the block, substantially as described.

In testimony whereof I affix my signature in presence of two witnesses.

WILLIAM L. COOP.

Witnesses:
A. J. THORNLEY,
J. R. LOWRY.